United States Patent [19]
Kadar-Kallen et al.

[11] Patent Number: 6,012,852
[45] Date of Patent: Jan. 11, 2000

[54] EXPANDED BEAM FIBER OPTIC CONNECTOR

[75] Inventors: Michael Kadar-Kallen; Jared D. Stack, both of Harrisburg; John R. Rowlette, Sr., Hummelstown; Dale D. Murray, Mount Joy, all of Pa.

[73] Assignee: The Whitaker Corporation, Wilmington, Del.

[21] Appl. No.: 08/895,512

[22] Filed: Jul. 16, 1997

Related U.S. Application Data

[63] Continuation of application No. 08/768,415, Dec. 18, 1996, abandoned.

[51] Int. Cl.$^7$ .............................. G02B 6/38; G02B 6/36
[52] U.S. Cl. .............................. 385/74; 385/80; 385/85
[58] Field of Search ........................ 385/37, 74, 78, 385/80, 85, 88, 93, 140; 350/96.21, 96.19; 340/632; 359/1

[56] References Cited

U.S. PATENT DOCUMENTS

| | | | |
|---|---|---|---|
| 3,809,455 | 5/1974 | Pekau et al. | 350/96 WG |
| 3,864,016 | 2/1975 | Dakss et al. | 350/96 WG |
| 3,975,082 | 8/1976 | Winzer | 350/96 C |
| 3,977,763 | 8/1976 | Ostrowsky et al. | 350/96 C |
| 4,057,319 | 11/1977 | Ash et al. | 350/96 C |
| 4,126,298 | 11/1978 | Szczepanek | 350/96.15 |
| 4,186,999 | 2/1980 | Harwood et al. | 350/96.21 |
| 4,337,993 | 7/1982 | Kompfner | 350/96.19 |
| 4,398,792 | 8/1983 | Horner et al. | 350/96.19 |
| 4,426,640 | 1/1984 | Becconsall et al. | 340/632 |
| 4,440,839 | 4/1984 | Mottier | 430/2 |
| 4,465,332 | 8/1984 | Horner et al. | 350/96.19 |
| 4,615,581 | 10/1986 | Morimoto | 350/96.21 |
| 4,787,700 | 11/1988 | Yin | 385/140 |
| 4,828,353 | 5/1989 | Yamaguchi et al. | 350/96.21 |
| 4,893,889 | 1/1990 | Iwakiri et al. | 385/140 |
| 4,907,851 | 3/1990 | Marhic | 350/96.19 |
| 4,925,267 | 5/1990 | Plummer et al. | 350/96.2 |
| 5,011,255 | 4/1991 | Bowen et al. | 350/96.19 |
| 5,016,966 | 5/1991 | Bowen et al. | 350/96.19 |
| 5,026,131 | 6/1991 | Jannson et al. | 350/3.7 |
| 5,061,027 | 10/1991 | Richard | 385/14 |
| 5,082,339 | 1/1992 | Linnebach | 385/14 |
| 5,093,879 | 3/1992 | Bregman et al. | 385/93 |
| 5,101,460 | 3/1992 | Richard | 385/37 |
| 5,140,657 | 8/1992 | Thylén | 385/37 |
| 5,146,080 | 9/1992 | Opheji | 250/216 |
| 5,202,775 | 4/1993 | Feldman et al. | 359/11 |
| 5,214,730 | 5/1993 | Nagasawa et al. | 385/59 |
| 5,237,434 | 8/1993 | Feldman et al. | 359/19 |
| 5,268,985 | 12/1993 | Ando et al. | 385/129 |
| 5,295,208 | 3/1994 | Caulfield et al. | 385/27 |
| 5,315,423 | 5/1994 | Hong | 359/124 |
| 5,335,300 | 8/1994 | Hartman et al. | 385/37 |
| 5,381,497 | 1/1995 | Toland et al. | 385/80 |
| 5,420,953 | 5/1995 | Boudreau et al. | 385/88 |
| 5,483,362 | 1/1996 | Tai et al. | 359/1 |

FOREIGN PATENT DOCUMENTS

| | | | |
|---|---|---|---|
| 56-5514 | 1/1981 | Japan | G02B 5/174 |
| 59-24818 | 2/1994 | Japan | G02B 7/26 |

OTHER PUBLICATIONS

M.Bass and M.L. Stitch; Laser Handbook, vol. 5; 1985; p. 515 (No Month Available).

A. Matzkin–Bridger; FOC/LAN 84, An Expanded Beam Lens Connector for Harsh Environments; Allied/Amphenol Products; Bendix Connector Operations (No Month Available).

*Primary Examiner*—Rodney Bovernick
*Assistant Examiner*—Quyen Phan Leung
*Attorney, Agent, or Firm*—June B. Schuette

[57] ABSTRACT

An optical connector system comprises mating first and second fiber ferrules (1, 11). Each ferrule (1, 11) has an endface (4, 14) polished at an angle to minimize backreflections. A holographic optical element (6) disposed on the first ferrule endface (4) receives a transmitted beam and expands the beam to an expanded beam (21) of collimated light. The expanded beam (21) is launched into an air gap (22) for receipt by a holographic optical element (16) disposed on the second ferrule (11). The holographic optical element (16) on the second ferrule (11) receives the expanded beam (21) and focuses it to be received by the fiber held in the second ferrule (11).

27 Claims, 4 Drawing Sheets

EXPANDED BEAM FIBER OPTIC CONNECTOR

This application is a Continuation of application Ser. No. 08/768,415 filed Dec. 18, 1996 now abandoned.

FIELD OF THE INVENTION

The present invention relates to fiber optic connectors and more particularly to fiber optic array connectors.

BACKGROUND OF THE INVENTION

The speed and bandwidth of data transmission over fiber optic cable renders optical fiber communication particularly advantageous for certain applications. In order to build and implement the requisite optical fiber infrastructure, there is a need for fiber optic connectors. Fiber optic connector systems typically comprise mating ferrules held by respective housings. The ferrules retain fibers in a fixed position within a fiber passage. The fiber held by the ferrule is polished to a flat mirror finish. An endface of the fiber is finished to be flush with an endface of the ferrule. Two polished fibers mate in coaxial alignment to effect an interconnection. Any irregularities, burrs or scratches in the fiber finish disperse or reflect light at the interconnection adversely affecting light transmission. In singlemode connectors, a ferrule endface having an endface transverse to the ferrule axis permits back reflections to propagate back towards the source of the light. To reduce the power of back reflections, there is known a ferrule having an angled endface ("APC" ferrule). The APC ferrule geometry advantageously diverts back reflections into the cladding of the fiber. In known APC ferrule endface geometry, the endfaces are arranged to mate in abutting contact with the endface surfaces parallel to each other.

A central portion or core of the fiber actually carries the optically encoded information. Optically encoded information traveling along the fiber optic core held in one ferrule and is received by the fiber core in the mating ferrule. Perfect concentricity of fiber cores permits maximum light transmission over the interconnection. Eccentricity of mating fiber cores increases insertion loss. A condition of gross misalignment can prevent transmission altogether. It is, therefore, important that fiber cores mate in coaxial alignment.

A fiber optic connector requires mutual alignment of respective fiber cores in a repeatable separable interconnect. The connector must also maintain performance characteristics over multiple matings and unmatings under various environmental conditions. A separable fiber optic interconnect introduces the possibility that dust may accumulate on the endface of the fiber core that may disperse and/or inhibit transmission of the light beam. Larger fiber cores are relatively resistant to the adverse affects of dust. Transmission performance of smaller fiber cores, such as singlemode fiber having a fiber core diameter of 9 microns, with a single spec of dust, however, is unacceptable. Environmental conditions, such as heat and vibration, may adversely effect concentricity of fiber optic cores over time causing unacceptable gaps in transmission. There is a need, therefore, for a robust fiber optic connector and for a fiber optic connector that is more resistant to fiber core misalignment.

There is known, an expanded beam connector system comprising first and second ferrules, each housing a fiber. A first discrete lens is mounted adjacent an endface of the first ferrule. The first lens receives a light beam from the first ferrule and expands the beam to a relatively larger diameter. The second ferrule and lens is similarly configured. The second lens of the mating connector receives the expanded beam and refocuses it to a fiber held in the second ferrule. The separable interface is in the plane of the mating expanded beams. The intersection of mating expanded beams defines a beam coupling region. An expanded beam connector system is robust by virtue of the larger beam coupling region rendering it more resistant to dust and misalignment. The lenses being discrete, however, create a bulky package in contravention of the desire to miniaturize connectors.

A fiber optic array connector system known as the MT style connector interconnects a plurality of fibers in two mating connectors. The MT style connector includes a multiple fiber ferrule, or array ferrule. Terminated and polished array ferrules mate in abutting relation similar to single fiber ferrule connectors. The endface finishing of a terminated array ferrule, is however, more difficult than a single fiber ferrule. The enhanced difficulty is due to the requirement for endface uniformity along all fibers. The enhanced difficulty is exacerbated when polishing an angle on a fiber array ferrule. Known APC fiber array ferrules require a finished flatness of less than 0.1 micron and angle uniformity of less than 0.1° over all fibers in order to yield an acceptable part. Nonuniformity in the finish of the endfaces causes gaps between some mating endfaces which increases insertion loss and back reflection between some, but not all, of the mating fibers. If all fibers do not have an acceptable endface finish, the entire fiber array ferrule is unacceptable. A known solution uses index matching gel between mating ferrules. The index matching gel is an acceptable solution for a fixed interconnect such as a splice, but is inappropriate at a separable interconnect. There is a need, therefore, for a multiple fiber ferrule having acceptable insertion loss under less stringent endface finish specifications.

For APC fiber array connectors, obtaining a finished angled endface on a fiber optic array ferrule is possible, but substantially more challenging than obtaining an angled endface on a single fiber ferrule. An APC MT connector requires use of a precision polishing process on the highest grade parts performed by skilled individuals. The precision polishing process is time consuming and, therefore, more costly to perform. Current technology requiring precision polishing on the highest grade ferrule produces APC array ferrules with relatively low yields rendering acceptable ferrules more costly. There is a need, therefore, for an APC array ferrule that is more resistant to endface finish irregularities.

SUMMARY

It is an object of the present invention to provide a fiber optic connector less susceptible to the adverse affects of fiber core eccentricity.

It is an object of the present invention to reduce the precision ferrule endface finishing for flat ferrule endfaces and APC ferrule endfaces required to produce an acceptable fiber array ferrule.

It is an object of the present invention to produce a single mode fiber array connector less susceptible to environmental conditions such as dust, vibration, and thermal changes.

It is an object of the present invention to produce a manufacturable fiber array connector.

An optical fiber connector system comprises first and second mating optical fiber ferrules. The endfaces of the mating ferrules are oriented antiparallel to each other. A beam expanding element is adjacent the first ferrule and launches an expanded beam. A beam focusing element adjacent the second ferrule receives the expanded beam and concentrates the expanded beam to a focused beam. The second ferrule receives the focused beam.

It is a feature of the present invention that fiber array ferrule endfaces are angled with respect to a plane transverse to the longitudinal axis of the ferrule.

It is a feature of the present invention that mating endfaces are antiparallel to each other.

It is a feature of the present invention that holographic optical elements are disposed on ferrule endfaces.

It is a feature of the present invention that a beam from a ferrule is expanded prior to being received by a mating ferrule.

It is a feature of the present invention that mating ferrules interconnect through a loosely toleranced air gap.

It is an advantage of the present invention that an expanded beam fiber optic connector minimizes return loss due to back reflections.

It is an advantage of the present invention that a fiber optic connector is less susceptible to dust accumulation.

It is an advantage of the present invention that a fiber optic connector system is less susceptible to beam misalignment at a separable interface.

It is an advantage of the present invention that a fiber array ferrule is less susceptible to finish irregularities at the ferrule endface.

DETAILED DESCRIPTION OF THE PREFERRED EMBODIMENT

Figure 1:
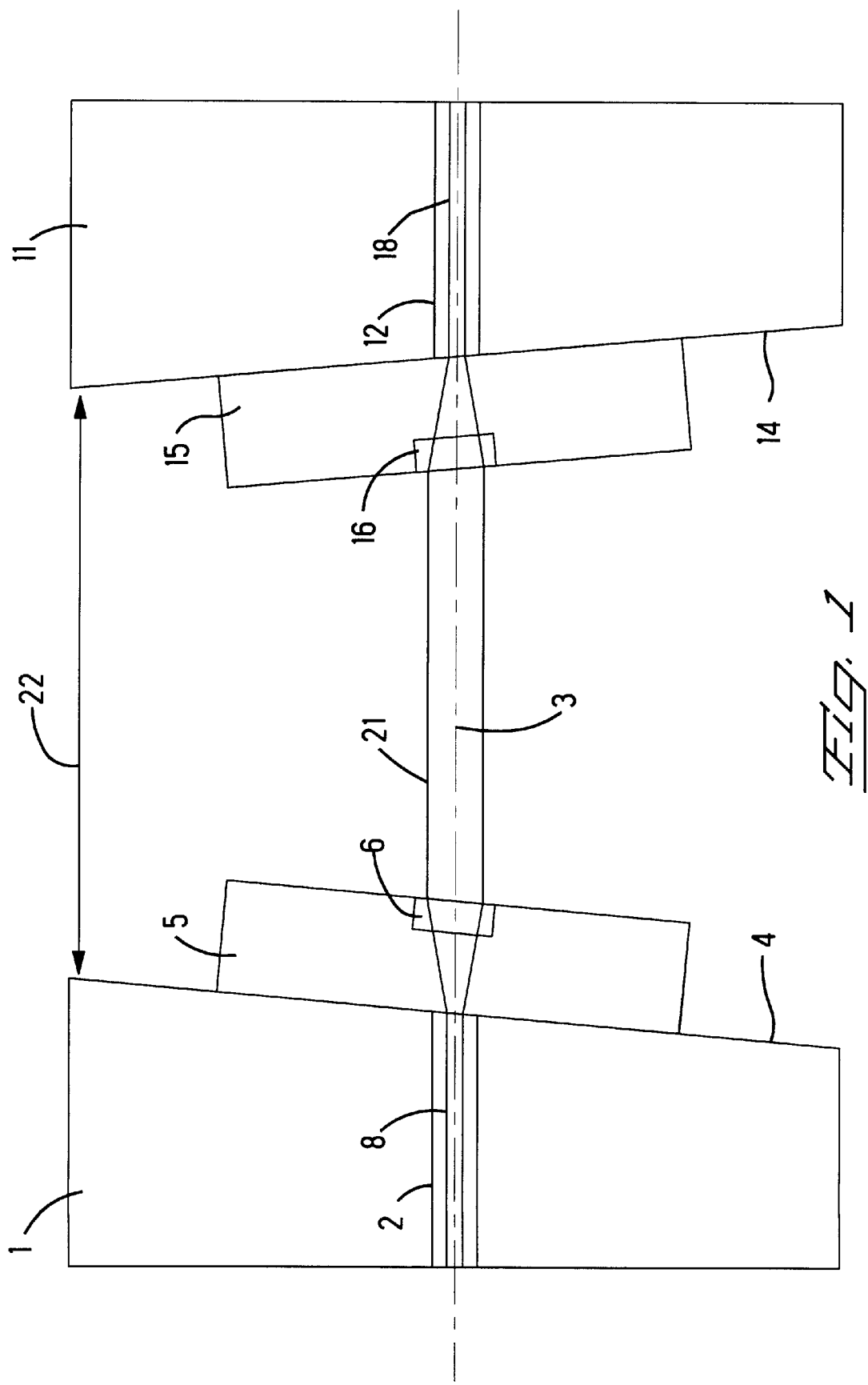
FIG. 1 is a conceptual rendition of the expanded and focused beam coupling arrangement.

With reference to the drawings, and with specific reference to FIG. 1, an optical fiber connector system comprises mating fiber array connectors. In a preferred embodiment, mating connectors are identical to each other, each connector comprising a ferrule 1 and 11 having a plurality of fiber passages 2 and 12 therein. Mating ferrules 1, 11 interconnect along longitudinal axis 3. The ferrules 1, 11 have an angled endface 4 and 14 and are terminated with singlemode fiber.

The endfaces 4, 14 are angle polished at, preferably, 9° off of a plane transverse to the longitudinal axis 3 in order to minimize back reflections in the connector. The fiber array connectors further comprise a chip 5 and 15, having a holographic optical element 6 and 16 ("HOE") thereon. Each chip 5, 15 is disposed adjacent the endface 4, 14 of the ferrule. In a preferred embodiment, each chip 5, 15 is affixed to the endface 4, 14 of the ferrule 1, 11 in abutting relation. The chip 5, 15 is oriented on the endface 4 so that the HOE aligns with a core 8 and 18 of the fiber terminated in the ferrule 1, 11.

In transmissive operation, the endfaces 4, 14 of mated ferrules 1, 11 are oriented antiparallel to and a controlled distance apart from each other as depicted in FIG. 1 of the drawings. As used in the context of the present patent application, the term "anti-parallel" means that the ferrule endfaces are disposed in a mirror image relation relative to each other. In the relationship described, it is as if a mirror is placed in a position oriented perpendicularly to the optic access of one of the ferrules to define the appropriate "anti-parallel" position of the second ferrule relative to the first ferrule. In the disclosed embodiment wherein each endface 4, 14 of the ferrules is angled 9° from the longitudinal axis 3, the anti-parallel disposition between the ferrule endfaces results in an 18° angle between the endfaces 4, 14. In a preferred embodiment of the invention, the ferrule array is terminated with a singlemode fiber having a 9 micron diameter. Other embodiments may, however, use different fiber types with varying core diameters. The HOE 6 receives a light beam from the 9 micron diameter fiber core 8 terminated in the ferrule 1 and expands the beam to a 126 micron diameter expanded beam 21. The HOE 6 launches the expanded beam 21 of collimated light energy into a distance controlled air gap 22 between mated ferrules 1, 11. Because the expanded beam 21 is collimated, the distance of the air gap 22 while controlled in a preferred embodiment is loosely toleranced. The optical fiber connector system, therefore, advantageously provides repeatable transmission performance over wide air gap 22 distance variations. The chip 15 of the mating ferrule 11, having the HOE 16 thereon, is affixed to the endface 14 of the mating ferrule 11. The mating HOE 16 receives the expanded beam 21 launched by the HOE 6 and refocuses the expanded beam 21 to a focused beam appropriate for receipt by the 9 micron diameter fiber core 18 in the mating ferrule 11.

In a preferred embodiment, the ferrules 1, 11 are molded MT style ferrules suitable for termination of singlemode fiber. With specific reference to FIGS. 2 and 3 of the drawings, the ferrule 1, 11 has twelve (12) fiber passages 2, 12 located in line on 250 micron centers. The fiber passages 12 are appropriately sized and positioned to receive singlemode fiber, and typically receive a singlemode ribbon fiber 23. Alternate embodiments may use other ferrule styles and/or multimode fiber. Other ferrule styles may have a different number of fiber conductors in a ferrule. Fiber passages may have differing relative orientations and may have different centering parameters. The MT style ferrule also comprises two guidepin holes (not shown) into which MT style precision guidepins 25 are retained or received. The guidepins 25 are parallel to the fiber passages 2, 12 and the longitudinal axis 3 of the connector system. The singlemode fiber ribbon 23 has twelve fibers connected via a web and is affixed in the MT style ferrule 1, 11 in accordance with conventional practices. It is believed that the ferrule endface 4, 14 of the terminated ferrule 1, 11 may be polished to a finish that is flat to within 1 micron and uniformly angled to within plus/minus 1°. The endface 4, 14 is polished according to the finish specifications resulting in some polish depth. The appropriate polish depth may or may not result in a portion of the endface 4, 14 being transverse to the longitudinal axis 3. As can be appreciated to one of ordinary skill in the art, the theoretical finish requirements for an acceptable part according to the teachings of the invention are relaxed substantially when compared to prior art finish requirements. The relaxed finish requirements should advantageously improve the yield and, therefore, lower the cost of acceptable terminated ferrules.

For use with the preferred ferrule described hereinabove, the chip 5, 15 has formed on it a holographic array of twelve HOEs 6, 16 in line on 250 micron centers. More specifically, the HOEs are designed to align with the cores 8, 18 of the fibers terminated in the preferred ferrule 1, 11 at the ferrule endface 4, 14. In a preferred embodiment, each HOE 6 is achromatic and designed to receive an optical beam having 1310 nanometer plus/minus 50 nanometers wavelength and a 9 micron diameter. Each HOE 6, 16 of the holographic array is generated using a method of fabricating a radially symmetric hologram disclosed in U.S. Pat. No. 5,202,775 to Feldman et al., the contents of which are hereby incorporated by reference. Further details of the process for generating the HOE's are found in U.S. Pat. No. 5,420,953 the contents of which are hereby incorporated by reference. Alternate embodiments may include a chip having HOE's oriented and configured for the desired ferrule, fiber, wavelength, and wavelength range of transmitted light.

Figure 4:
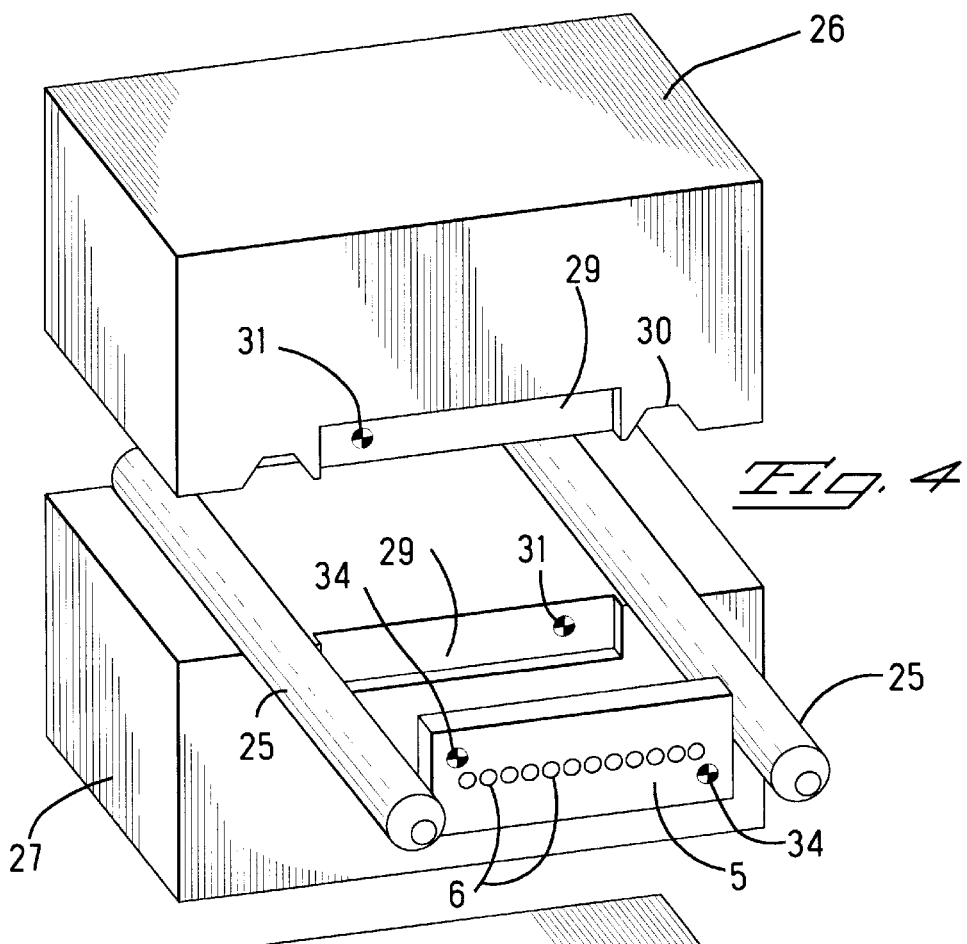
FIG. 4 is an exploded perspective view of the fixture used to affix the holographic optical element (HOE) to the MT style connector according to the teachings of the present invention.
Figure 5:
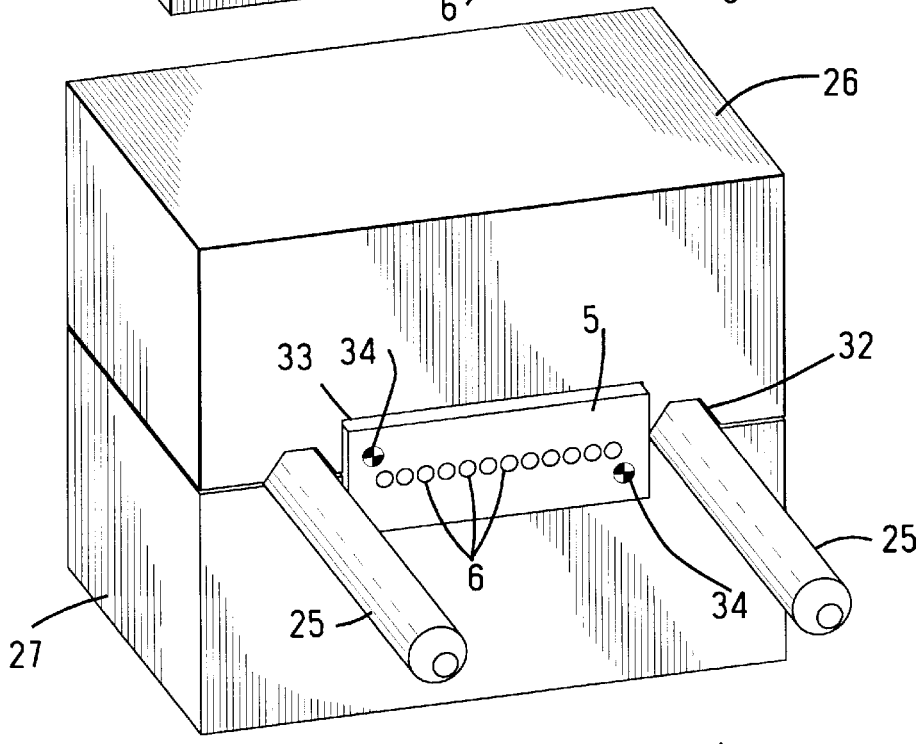
FIG. 5 is a perspective view of the assembled fixture shown in FIG. 4 receiving a chip having an array of HOEs thereon.
Figure 6:
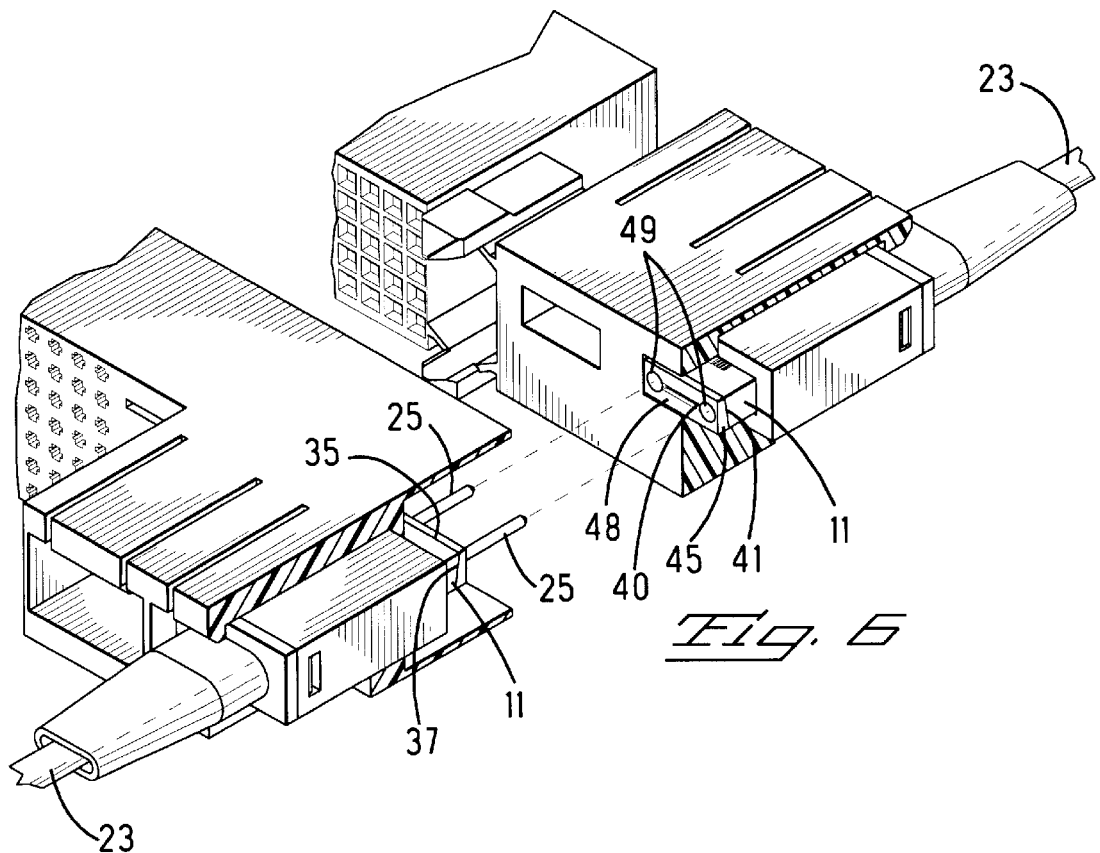
FIG. 6 is a perspective view shown in partial cut away of an unmated MT connector system according to the teachings of the present invention shown in an anticipated backplane system application.
Figure 7:
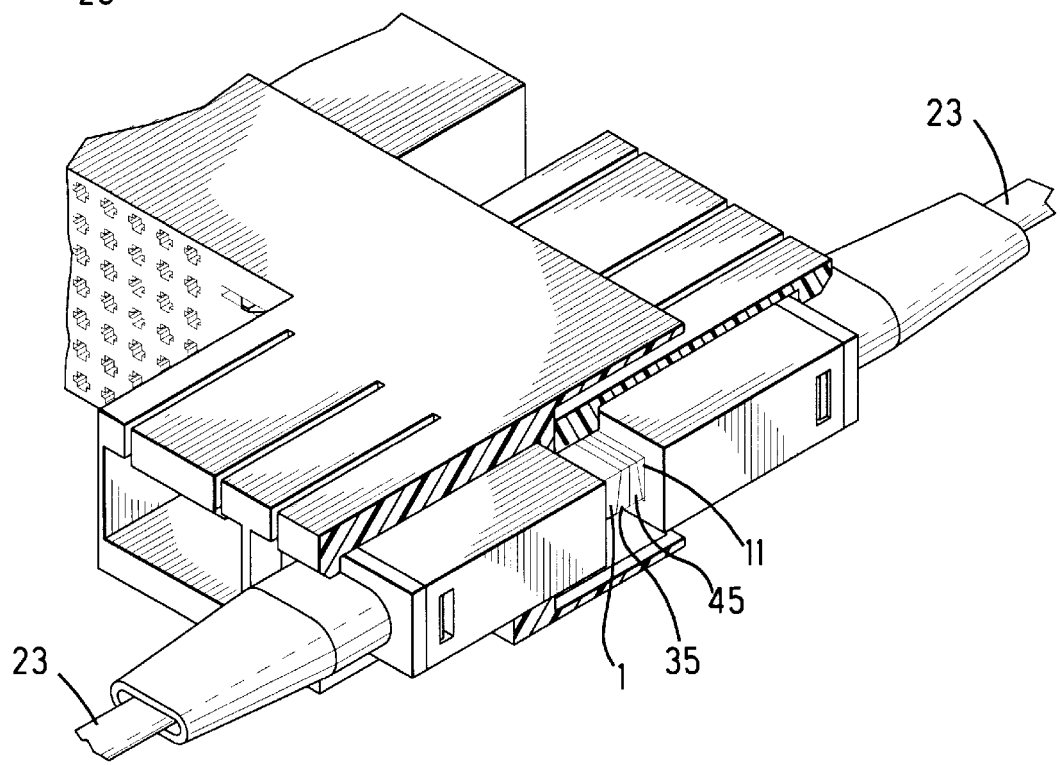
FIG. 7 is a perspective view shown in partial cut away of a mated MT connector system according to the teachings of the present invention shown in an anticipated backplane system application.

A preferred method of affixing the chip 5, 15 to the ferrule endface 4, 14 uses a fixture as shown in FIGS. 4 and 5. The fixture comprises hermaphroditic first and second fixture halves 26 and 27 respectively, and two precision MT style guidepins 25 similar to the guidepins used in the conventional MT style connector. Each fixture half 26, 27 comprises a relief area 29 and two guidepin grooves 30. Each relief area 29 has a nest fiducial 31 proximate a bounded corner of the relief area 29. The nest fiducial 31 takes the form of two quarter circles positioned opposite each other and having a common vertex. In the assembled fixture, the fixture halves 26, 27 meet such that the guidepin grooves 30 form a guide pin hole 32 and the relief areas 29 form a nest 33. The nest fiducials 31 are oriented proximate opposite corners of the nest 33. The guidepins 25 are retained within the guidepin holes 32. The guidepins 25 in the assembled fixture are mounted for appropriate precision mating with the MT style ferrule 1, 11.

Each chip 5, 15 has two chip fiducials 34 proximate opposite corners. The nest 33 is complementary to the size and shape of the chip 5, 15. To mount the chip 5, 15 to the ferrule 1, 11, the chip 5, 15 is placed in the nest 33 of the fixture using conventional pick and place technology. Initial placement of the chip 5, 15 aligned by edges of the nest 33 results in approximate placement of the chip 5, 15 to the nest 33. For improved and proper alignment of the HOE 6, 16 to the fiber core 8, 18, each chip fiducial 34 is complementary to each nest fiducial 31. An operator uses a video microscope to monitor the placement of the chip 5, 15 relative to the nest 33. As the chip 5, 15 is translucent, an operator uses the complementary chip and nest fiducials 34, 31 as a positioning reference. The operator adjusts the position of the chip 5, 15 relative to the nest 33 until the chip and nest fiducials 34, 31 align to represent a complete circle. Once aligned, a vacuum is applied to hold the chip 5, 15 in the nest 33. Index matching adhesive is applied to the surface of the chip 6, 16 held in the nest 29. An index matching adhesive is preferred because it advantageously provides for affixing the chip 5, 15 to the endface 4, 14 as well as accommodating any gaps that may be present between the ferrule endface 4, 14 and the HOE 6, 16 on the chip 5, 15 due to irregularities in the endface finishing process.

Alternatively, any index matching medium may be used. The ferrule 1, 11 is mated to the fixture and the adhesive cures. It is believed that the index matching adhesive will fill in any air gaps created between the HOE 6, 16 and the fiber core 8, 18 due to ferrule endface 4, 14 nonuniformity. When the adhesive is cured, the vacuum is released and the ferrule 1, 11 and mounted chip 5, 15 may be removed as a unit.

Figure 2:
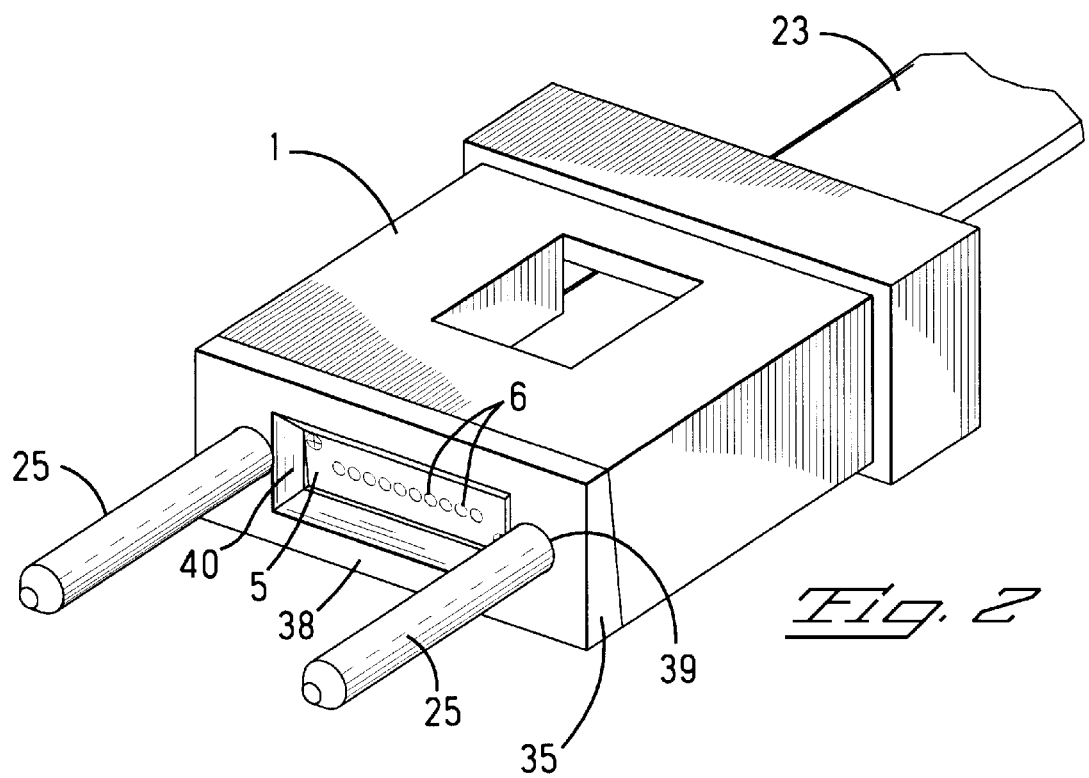
FIG. 2 is a perspective view of an assembled MT style connector in accordance with the teachings of the present invention.
Figure 3:
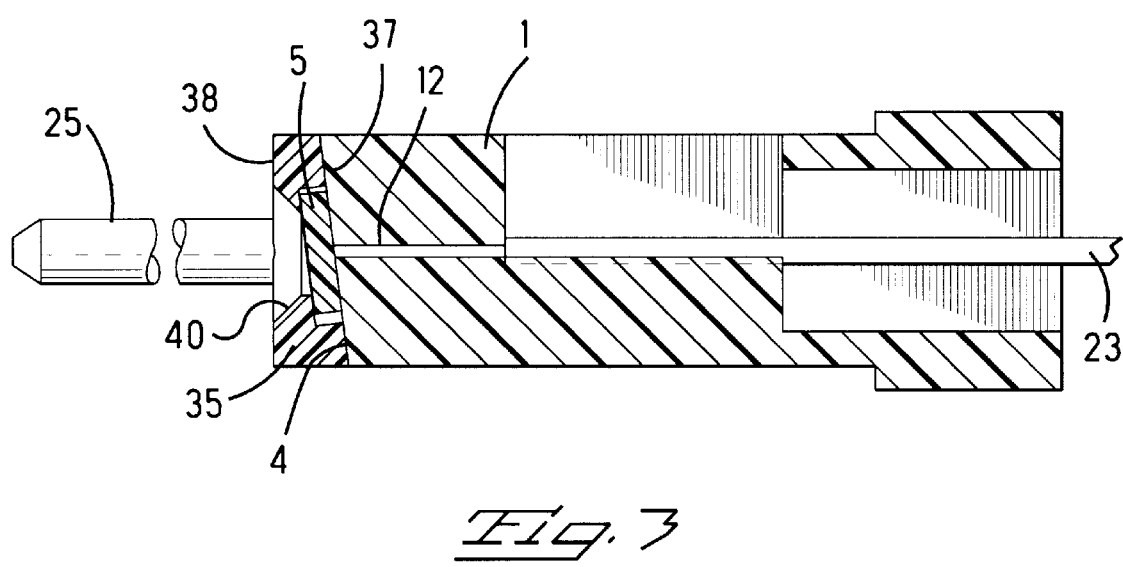
FIG. 3 is a planar cross section of the MT style connector as shown in FIG. 2.

With specific reference to FIGS. 2 and 3 of the drawings, a positioning member 35 and 45 is mounted to each endface 4, 14 respectively. Each positioning member 35, 45 comprises a rectangular frame having two major surfaces; an endface surface 37 and 47 and a mating surface 38 and 48 and four minor sides. Opposite ends of the positioning member 35, 45 each have a frame guidepin hole 39 and 49 therethrough that aligns the positioning member 35, 45 to the ferrule 1, 11. An outer circumference of the positioning member 35, 45 has the same size and shape as the outer circumference of the ferrule 1, 11. The endface surface 37, 47 is planar and angled at 9°. The endface surface 37, 47 is complementary to the ferrule endface 4, 14 such that the mating surface 38, 48 is transverse to the longitudinal axis 3 when the endface surface 37, 47 of the positioning member 35, 45 abuts the ferrule endface 4, 14 and the ferrule guide pin holes align with the guidepin holes 39, 49 of the positioning member 35, 45. The positioning member 35, 45 has a central rectangular opening 40 sized and oriented to permit the expanded beam 21 to pass therethrough. The opening 40 is beveled for ease of maintenance and cleaning. Mating ferrules 1, 11 interconnect when the mating surfaces 38, 48 of the positioning members 35, 45 are in abutting relation. The positioning member 35, 45 maintains the controlled distance air gap 22 of 200 microns to 300 microns between endfaces 4, 14 of mating connectors in a preferred embodiment. It is believed that the presence of the air gap may be of some advantage by placing in it optical components for further light beam processing.

Other advantages of the invention are apparent from the detailed description by way of example, and from the spirit and scope of the appended claims.

We claim:

1. An optical fiber connector system comprising:
   a) first and second mating optical fiber ferrules having angled first and second endfaces disposed antiparallel to each other,
   b) a beam expanding element disposed adjacent said first ferrule endface and launching an expanded beam, and
   c) a beam focusing element disposed adjacent said second ferrule endface receiving said expanded beam and concentrating said expanded beam to a focused beam, wherein said second ferrule receives said focused beam.

2. The optical fiber connector as in claim 1 wherein said first and second ferrules are fiber array ferrules.

3. The optical fiber connector as in claim 2 wherein said beam expanding element is a holographic optical array.

4. The optical fiber connector as in claim 2 wherein said beam focusing element is a holographic optical array.

5. The optical fiber connector as in claim 2 wherein said beam expanding element is a lens array.

6. The optical fiber connector as in claim 2 wherein said beam focusing element is a lens array.

7. The optical fiber connector as in claim 1 wherein said beam expanding element is a holographic optical element.

8. The optical fiber connector as in claim 7 wherein said holographic optical element is achromatic.

9. The optical fiber connector as in claim 1 wherein said beam focusing element is a holographic optical element.

10. The optical fiber connector as in claim 9 wherein said holographic optical element is achromatic.

11. The optical fiber connector as in claim 1 wherein said beam expanding element and said beam focusing element are holographic optical elements having identical optical characteristics.

12. The optical fiber connector as in claim 11 wherein said holographic optical elements are achromatic.

13. The optic fiber connector system as in claim 1 and further comprising an index matching medium between said first ferrule and said beam expanding element.

14. The optic fiber connector system as in claim 1 and further comprising an index matching medium between said second ferrule and said beam focusing element.

15. The optical connector as in claim 1 wherein said first and second fiber ferrules retain singlemode fibers.

16. The optical connector as in claim 1 and further comprising a first ferrule positioning member adjacent said first ferrule.

17. The optical connector as in claim 16 and further comprising a second ferrule positioning member adjacent said second ferrule.

18. The optical connector as in claim 17 wherein said first and second ferrules mate along a longitudinal axis and wherein said first ferrule positioning member and said second ferrule positioning member each comprise a frame, each said positioning member having an endface surface and a mating surface and further wherein each said endface surface is angled relative to the mating surface and complementary to the ferrule endface and mating surfaces meet in a plane transverse to the longitudinal axis.

19. The optical connector as in claim 1 and further comprising a second ferrule positioning member adjacent said second ferrule.

20. The optical fiber connector as in claim 1 wherein said beam expanding element is a lens.

21. The optical fiber connector as in claim 1 wherein said beam focusing element is a lens.

22. An optical fiber connector system comprising:
   a) first and second mating optical fiber array ferrules having first and second angled endfaces in anti-parallel relationship to each other,
   b) a beam expanding array disposed adjacent said first ferrule endface and launching a plurality of expanded beams, and
   c) a beam focusing array disposed adjacent said second ferrule endface receiving said plurality of expanded beams and concentrating each said expanded beam to a focused beam, wherein said second ferrule receives a plurality of said focused beams.

23. The optical fiber connector system as in claim 22 wherein said beam expanding array is an array of holographic optical elements.

24. The optical fiber connector system as in claim 22 wherein said beam focusing array is an array of holographic optical elements.

25. The optical fiber connector system as in claim 22 wherein said beam expanding array and said beam focusing array are arrays of achromatic holographic optical elements having identical optical characteristics.

26. The optical fiber connector as in claim 22 wherein said beam expanding array is a plurality of lenses.

27. The optical fiber connector as in claim 22 wherein said beam focusing array is a plurality of lenses.

* * * * *